(No Model.)

G. T. HUTCHINSON.
WHEEL WRENCH.

No. 414,771. Patented Nov. 12, 1889.

Witnesses
M. B. Harris
W. J. Johnston

Inventor
George T. Hutchinson
By Edw. J. Underwood
Attorney

UNITED STATES PATENT OFFICE.

GEORGE T. HUTCHINSON, OF EDGAR, NEBRASKA.

WHEEL-WRENCH.

SPECIFICATION forming part of Letters Patent No. 414,771, dated November 12, 1889.

Application filed May 7, 1889. Serial No. 309,919. (No model.)

*To all whom it may concern:*

Be it known that I, GEORGE T. HUTCHINSON, a citizen of the United States, residing at Edgar, in the county of Clay and State of Nebraska, have invented certain new and useful Improvements in Nut-Detachers for Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in nut-removers for the wheels of vehicles; and it consists in certain peculiarities of construction hereinafter pointed out, and fully illustrated in the accompanying drawings.

Its object is to provide a means of removing the nut from the axle of a wheel for the purpose of lubricating the same, and of retaining the nut during the lubricating process and replacing the same afterward, thus obviating soiling the hands of the manipulator and preventing the accidental fall of the nut into the dirt, which so frequently occurs when an ordinary wrench is used.

Figure 1:
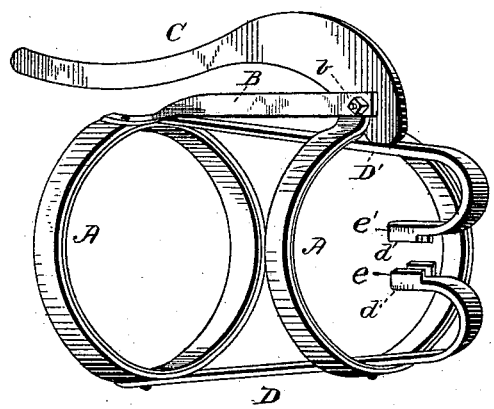
Figure 2:
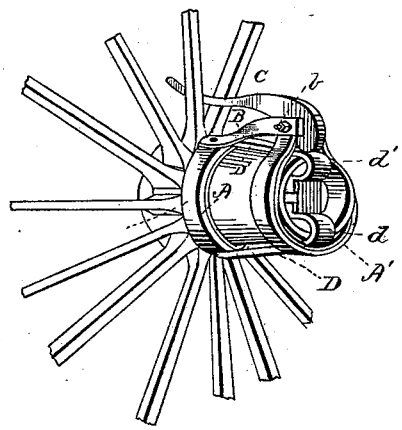
Figure 3:
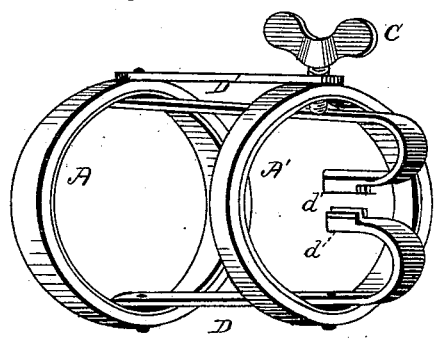

In the drawings, Figure 1 is a plan view of my device. Fig. 2 shows the same applied to a wheel, and Fig. 3 illustrates a modification of the same.

A A' are two metallic rings, which are designed to encircle the hub of a vehicle-wheel. They are lined with a packing of leather, rubber, or felt to prevent defacing the varnish on the exterior of the hub, and are connected by means of a bar B, bolted to the rings, and having an opening $b$ to receive the pivot of a lever C, which operates the device. Attached to ring A by bolts or equivalent means are a pair of steel springs D D', one D being also secured to the ring A', having their free ends bent round to form jaws $d$ $d'$ to engage with the nut on the axle when the rings are placed on the hub. The jaw ends are provided with flanges $e$ $e'$ to grasp the opposite sides of the nut and prevent slipping.

C is the lever pivoted in the connecting-bar, which by its pressure on the spring D' forces the spring-jaws against the nut and locks the same securely.

The operation of my device is as follows: The rings are slipped over the hub of the wheel desired to be removed until the spring-jaws grasp two opposite sides of the nut. Then the lever C is actuated until the jaws are locked on the nut, and at the same time the spring D' is pressed down against and secured upon the hub. Then the wheel is turned backward on the axle and the nut unscrewed from the same, when the wheel and nut can be removed together. After lubrication the reverse movement replaces the nut and wheel.

A modification of my device is shown in Fig. 3, where a thumb-screw is substituted for the locking-lever.

Having thus described my invention, what I claim, and desire to secure by Letters Patent, is—

A nut-detacher consisting of two metallic rings to encircle the hub of a vehicle-wheel, lined with a soft packing, and connected by a cross-bar carrying a lever and having two steel springs connected therewith, their ends being bent into jaws to engage with the axle-nut, the said springs having their ends flanged, as described, and being operated by the lever aforesaid, all substantially as described.

In testimony whereof I affix my signature in presence of two witnesses.

GEORGE T. HUTCHINSON.

Witnesses:
J. A. ROBERTS,
C. A. DEAN.